Sept. 11, 1928.   E. J. WIRFS, JR   1,683,942

GASKET

Filed Nov. 8, 1926

Inventor:
EDWARD J. WIRFS JR.,
His Attorney.

Patented Sept. 11, 1928.

1,683,942

UNITED STATES PATENT OFFICE.

EDWARD J. WIRFS, JR., OF GLENDALE, MISSOURI, ASSIGNOR TO E. J. WIRFS ORGANIZATION, INCORPORATED, OF ST. LOUIS, MISSOURI, A CORPORATION OF MISSOURI.

GASKET.

Application filed November 8, 1926. Serial No. 147,077.

This invention relates to gaskets of the character adapted for use as packing around refrigerator doors as a weatherstrip for doors, windows, etc., and for various other uses where a seal is desired.

One of the objects of this invention is to provide a gasket in which a roll of soft fibrous material is closely confined by an envelope of flexible waterproof fabric whose free edges are extended to provide a tacking lap, but in which the tacking lap is secured or reinforced in a simple and effective manner.

Another object is to provide a gasket of the character described, which is simple in construction, effective in its action, neat in appearance, durable and economical to manufacture.

Further objects will appear from the detail description taken in connection with the accompanying drawing in which Figure 1 is a section through a door and its jamb illustrating the application of the gasket embodying this invention.

Figure 1:
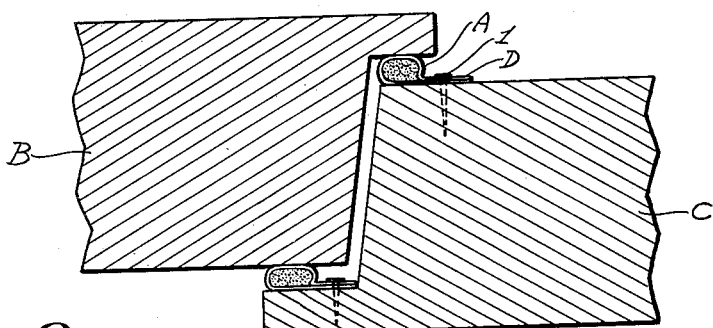

Referring to the accompanying drawing and more particularly to Figure 1, A designates a gasket which is arranged for placement between the door B and the jamb C, as for instance is used in a refrigerator. The gasket has a tacking lap D through which fasteners, such as tacks 1 may be passed to apply the same.

Figures 3, 4:
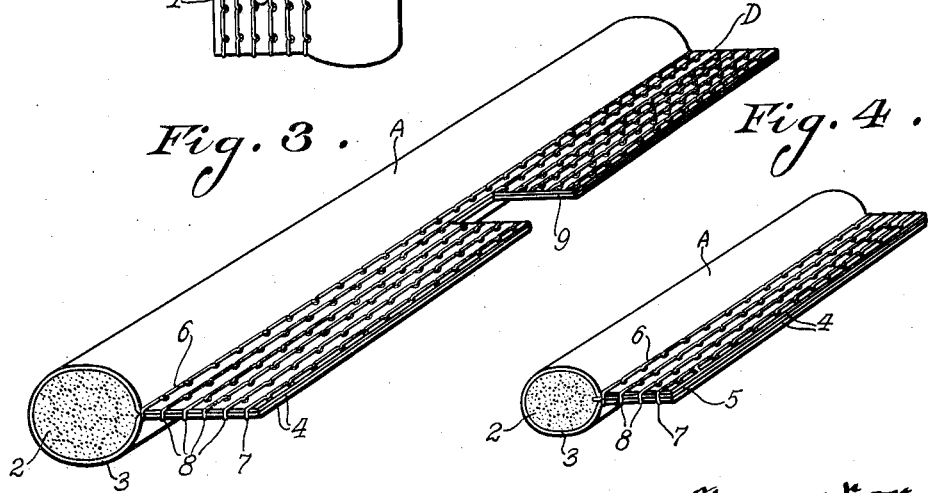
Figure 3 is a perspective view showing one embodiment of this invention.
Figure 4 is a similar view showing another embodiment of this invention.

Referring to Figure 3, the gasket comprises a roll 2 of soft fibrous material, such as cotton, and enclosed by an envelope 3 of flexible waterproof material such as rubberized cotton. The free edges of the envelope are extended as shown at 4 to provide a tacking lap D and an inside line of stitches 6 passes through the fabric plies along the roll and is adapted to closely confine the same in order to provide a tight and yielding packing which will freely yield to form an effective seal and when pressure is relieved will return to a circular shape. A line of stitches 7 passes through the fabric plies along the outer edge of the tacking lap in order to close the same as well as to stiffen the structure and prevent buckling. Additional stitches 8 pass through the fabric plies between the lines of stitches 6 and 7 and these stitches are preferably arranged in a series of parallel lines along and between the lines of stitches 6 and 7 so as to additionally reinforce the lap and prevent buckling.

In Figure 4 the plies 4 have inserted therebetween an additional ply 5 of waterproof fabric, or any other suitable material, in order to additionally strengthen and reinforce the tacking lap, and the various lines of stitches pass through all three of these plies, the inside ply 5 being preferably extended so as to be engaged by the inside line of stitches 6, while the outside line of stitches 7 also closes the outer edge of the tacking lap.

Figure 2:
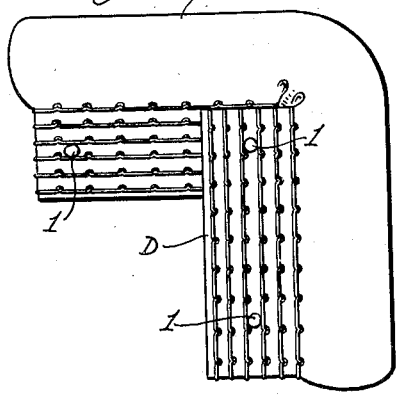
Figure 2 is a view showing the method of applying such a gasket when turning corners.

In the application of this gasket the fasteners 1 pierce the tacking lap and secure the gasket in place, and in view of the fact that this tacking lap is reinforced by the lines of stitches, not only will this tacking lap be stiffened transversely but also longitudinally, so that not only is buckling prevented but the tacking lap will be strengthened in its own plane. This is of particular advantage in view of the fact that the securing fasteners are applied only at intervals so that the reinforcement of the tacking lap between the fasteners is of particular utility. In turning corners, as shown in Figure 2, the tacking lap is cut or notched, as shown at 9, Figure 3, so as to permit such turning and the lapped portions can then be secured by a fastener as shown in Figure 2. The provision of the inside line of stitches 6, not only permits the notching to be accomplished while still retaining the roll tight at the point of turning, but the additional stitches, more particularly the stitches 8, prevent buckling and maintain the tacking lap flat and tight. A tacking lap so reinforced can be comparatively thin and accordingly two ply while still securing the required stiffness and strength. This is of particular advantage in small gaskets where the thickness of the tacking lap must be limited on account of the limited space, and on account of the comparatively small roll.

It is obvious that various other changes may be made in the details of construction without departing from the spirit of this invention; it is, therefore, to be understood that this invention is not to be limited to the specific details shown and described.

Having thus described the invention what is claimed is:

1. A gasket comprising, a roll of soft fibrous material, an envelope of flexible waterproof fabric enclosing said roll and having its free edges extended to provide a tacking lap, an inside line of stitches passing through the fabric plies along said roll and adapted to confine the same in order to provide a tight but yielding packing, a line of stitches passing through the fabric plies along the outer edge of the tacking lap in order to close the same, and means extending continuously along and securing the fabric plies closely together between the lines of stitches therethrough adapted to transversely and longitudinally reinforce the tacking lap and hold the same against buckling.

2. A gasket comprising, a roll of soft fibrous material, an envelope of flexible waterproof fabric enclosing said roll and having its free edges extended to provide a tacking lap, an inside line of stitches passing through the fabric plies along said roll and adapted to confine the same in order to provide a tight but yielding packing, a line of stitches passing through the fabric plies along the outer edge of the tacking lap in order to close the same, and stitches extending along and passing through the fabric plies between the lines of stitches therethrough adapted to secure the tacking lap plies together both transversely and longitudinally substantially as and for the purpose set forth.

3. A gasket comprising, a roll of soft fibrous material, an envelope of flexible waterproof fabric enclosing said roll and having its free edges extended to provide a tacking lap, an inside line of stitches passing through the fabric plies along said roll and adapted to confine the same in order to provide a tight but yielding packing, a line of stitches passing through the fabric plies along the outer edge of the tacking lap in order to close the same, a reinforcing ply of flexible waterproof fabric between the tacking lap plies, and means extending continuously along and securing the tacking lap and reinforcing plies closely together between the lines of stitches therethrough adapted to transversely and longitudinally reinforce the tacking lap and hold the same against buckling.

4. A gasket comprising, a roll of soft fibrous material, an envelope of flexible waterproof fabric enclosing said roll and having its free edges extended to provide a tacking lap, an inside line of stitches passing through the fabric plies along the said roll and adapted to confine the same in order to provide a tight but yielding packing, a line of stitches passing through the fabric plies along the outer edge of the tacking lap in order to close the same, a reinforcing ply of flexible waterproof fabric along the tacking lap plies and included within and secured by said line of stitches, and stitches passing through said plies between the lines of stitches therethrough adapted to secure the tacking lap plies together both transversely and longitudinally substantially as and for the purpose set forth.

In testimony whereof I hereby affix my signature this 4th day of October, 1926.

EDWARD J. WIRFS, Jr.